United States Patent
Krokhmal et al.

(10) Patent No.: US 12,249,059 B2
(45) Date of Patent: Mar. 11, 2025

(54) NAVIGATION ACCURACY USING CAMERA COUPLED WITH DETECTOR ASSEMBLY

(71) Applicant: BRUKER TECHNOLOGIES LTD., Migdal HaEmek (IL)

(72) Inventors: Alexander Krokhmal, Haifa (IL); Alexander Brandt, Tiberias (IL); Dor Perry, Haifa (IL); Asher Peled, Kfar-Vradim (IL); Matthew Wormington, Highlands Ranch, CO (US)

(73) Assignee: Bruker Technologies Ltd., Migdal HaEmek (IL)

( * ) Notice: Subject to any disclaimer, the term of this patent is extended or adjusted under 35 U.S.C. 154(b) by 483 days.

(21) Appl. No.: 17/709,451

(22) Filed: Mar. 31, 2022

(65) Prior Publication Data

US 2023/0316487 A1    Oct. 5, 2023

(51) Int. Cl.
 *G06T 7/00* (2017.01)
(52) U.S. Cl.
 CPC .. *G06T 7/0004* (2013.01); *G06T 2207/10116* (2013.01); *G06T 2207/30148* (2013.01)
(58) Field of Classification Search
 CPC ......... G06T 7/0004; G06T 2207/10116; G06T 2207/30148
 See application file for complete search history.

(56) References Cited

U.S. PATENT DOCUMENTS

| | | | |
|---|---|---|---|
| 4,567,605 A | 1/1986 | Bartels | |
| 4,794,648 A | 12/1988 | Ayata et al. | |
| 4,821,301 A | 4/1989 | Cocks et al. | |
| 4,989,226 A | 1/1991 | Woodbury et al. | |
| 5,016,267 A | 5/1991 | Wilkins | |
| 5,199,058 A | 3/1993 | Tani et al. | |
| 5,245,648 A | 9/1993 | Kinney et al. | |
| 5,481,109 A | 1/1996 | Ninomiya et al. | |

(Continued)

FOREIGN PATENT DOCUMENTS

| | | |
|---|---|---|
| CN | 101960298 A | 1/2011 |
| CN | 202305445 U | 7/2012 |

(Continued)

OTHER PUBLICATIONS

KR Application # 1020217002987 Office Action dated Oct. 31, 2023.

(Continued)

*Primary Examiner* — David F Dunphy
(74) *Attorney, Agent, or Firm* — Meitar Patents Ltd.; Daniel Kligler

(57) ABSTRACT

A system includes first and second imaging assemblies, and a processor. The first imaging assembly is configured to produce a first image of a measurement site in a sample. The second imaging assembly is coupled with a measurement assembly and is configured to produce a second image of the measurement site. The processor is configured to: (i) perform, based on the first image, a first movement of the sample relative to the measurement assembly, (ii) perform, based on the second image, a second movement of the sample for aligning the sample with the measurement assembly, and (iii) control the measurement assembly to perform a measurement in the measurement site.

23 Claims, 4 Drawing Sheets

(56) References Cited

U.S. PATENT DOCUMENTS

| | | | |
|---|---|---|---|
| 5,509,043 A | 4/1996 | Van Der Sluis |
| 5,619,548 A | 4/1997 | Koppel |
| 5,740,226 A | 4/1998 | Komiya et al. |
| 5,802,137 A | 9/1998 | Wilkins |
| 5,900,645 A | 5/1999 | Yamada |
| 5,937,026 A | 8/1999 | Satoh |
| 6,041,098 A | 3/2000 | Touryanski et al. |
| 6,061,426 A | 5/2000 | Linders et al. |
| 6,108,398 A | 8/2000 | Mazor et al. |
| 6,163,592 A | 12/2000 | He et al. |
| 6,226,349 B1 | 5/2001 | Schuster et al. |
| 6,242,745 B1 | 6/2001 | Berlad et al. |
| 6,271,534 B1 | 8/2001 | Kumakhov |
| 6,381,303 B1 | 4/2002 | Vu et al. |
| 6,385,289 B1 | 5/2002 | Kikuchi |
| 6,389,102 B2 | 5/2002 | Mazor et al. |
| 6,421,414 B1 | 7/2002 | Huber |
| 6,512,814 B2 | 1/2003 | Yokhin et al. |
| 6,556,652 B1 | 4/2003 | Mazor et al. |
| 6,574,306 B2 | 6/2003 | Kikuchi |
| 6,639,968 B2 | 10/2003 | Yokhin et al. |
| 6,665,372 B2 | 12/2003 | Bahr et al. |
| 6,680,996 B2 | 1/2004 | Yokhin et al. |
| 6,750,952 B2 | 6/2004 | Grodnensky et al. |
| 6,754,304 B1 | 6/2004 | Kumakhuv |
| 6,754,305 B1 | 6/2004 | Rosencwaig et al. |
| 6,782,076 B2 | 8/2004 | Bowen et al. |
| 6,810,105 B2 | 10/2004 | Nasser-Ghodsi et al. |
| 6,859,520 B2 | 2/2005 | He et al. |
| 6,879,051 B1 | 4/2005 | Singh et al. |
| 6,895,075 B2 | 5/2005 | Yokhin et al. |
| 7,035,373 B2 | 4/2006 | Omote |
| 7,068,753 B2 | 6/2006 | Berman et al. |
| 7,076,024 B2 | 7/2006 | Yokhin |
| 7,110,491 B2 | 9/2006 | Mazor et al. |
| 7,113,566 B1 | 9/2006 | Peled et al. |
| 7,120,228 B2 | 10/2006 | Yokhin et al. |
| 7,242,745 B2 | 7/2007 | He et al. |
| 7,257,192 B2 | 8/2007 | Omote |
| 7,406,153 B2 | 7/2008 | Berman |
| 7,453,985 B2 | 11/2008 | Mazor et al. |
| 7,481,579 B2 | 1/2009 | Yokhin et al. |
| 7,483,513 B2 | 1/2009 | Mazor et al. |
| 7,542,548 B2 | 6/2009 | Matsuo et al. |
| 7,551,719 B2 | 6/2009 | Yokhin et al. |
| 7,600,916 B2 | 10/2009 | Yokhin et al. |
| 7,646,849 B2 | 1/2010 | Iwasaki et al. |
| 7,653,174 B2 | 1/2010 | Mazor et al. |
| 7,684,543 B2 | 3/2010 | Matsuo et al. |
| 7,711,091 B2 | 5/2010 | Sasaki et al. |
| 7,801,272 B2 | 9/2010 | Toraya |
| 7,817,779 B2 | 10/2010 | Ando |
| 8,085,900 B2 | 12/2011 | Omote |
| 8,243,878 B2 | 8/2012 | Yokhin et al. |
| 8,249,220 B2 | 8/2012 | Verman et al. |
| 8,340,248 B2 | 12/2012 | Toraya et al. |
| 8,422,633 B2 | 4/2013 | Lantz et al. |
| 8,437,450 B2 | 5/2013 | Wall et al. |
| 8,687,766 B2 | 4/2014 | Wormington et al. |
| 9,269,468 B2 | 2/2016 | Ryan et al. |
| 9,335,282 B2 | 5/2016 | Omote et al. |
| 9,606,073 B2 | 3/2017 | Mazor et al. |
| 9,632,043 B2 | 4/2017 | Mazor et al. |
| 9,778,213 B2 | 10/2017 | Bakeman et al. |
| 10,352,695 B2 | 7/2019 | Dziura et al. |
| 10,386,313 B2 | 8/2019 | Mazor et al. |
| 10,816,487 B2 | 10/2020 | Matney et al. |
| 11,181,490 B2 | 11/2021 | Dikopoltsev et al. |
| 2001/0043668 A1 | 11/2001 | Hayashi et al. |
| 2003/0128809 A1 | 7/2003 | Umezawa et al. |
| 2004/0032581 A1 | 2/2004 | Nikoonahad et al. |
| 2004/0156474 A1 | 8/2004 | Yokhin et al. |
| 2006/0284081 A1 | 12/2006 | Miyamoto et al. |
| 2006/0288325 A1 | 12/2006 | Miyamoto et al. |
| 2006/0289790 A1 | 12/2006 | Raymond et al. |
| 2007/0290703 A1 | 12/2007 | Hollman |
| 2008/0239318 A1 | 10/2008 | Den Boef et al. |
| 2009/0095913 A1 | 4/2009 | Yu et al. |
| 2011/0210250 A1 | 9/2011 | Nakayama et al. |
| 2011/0268251 A1 | 11/2011 | He |
| 2014/0019097 A1 | 1/2014 | Bakeman et al. |
| 2014/0151569 A1 | 6/2014 | Schnablegger et al. |
| 2015/0110249 A1 | 4/2015 | Bakeman et al. |
| 2015/0241469 A1 | 8/2015 | Osborne et al. |
| 2015/0300965 A1 | 10/2015 | Sezginer et al. |
| 2015/0369759 A1 | 12/2015 | Mazor et al. |
| 2017/0199136 A1 | 7/2017 | Krokhmal et al. |
| 2017/0227478 A1 | 8/2017 | Grimshaw et al. |
| 2017/0259085 A1 | 9/2017 | Bennett et al. |
| 2017/0307548 A1 | 10/2017 | Bykanov et al. |
| 2018/0106735 A1 | 4/2018 | Gellineau et al. |
| 2019/0049602 A1 | 2/2019 | Hench et al. |
| 2019/0310080 A1 | 10/2019 | Hill et al. |
| 2019/0317031 A1 | 10/2019 | Gateshki et al. |
| 2019/0323974 A1 | 10/2019 | Wormington et al. |
| 2019/0323975 A1 | 10/2019 | Wormington et al. |
| 2019/0323976 A1 | 10/2019 | Vinshtein et al. |
| 2020/0319443 A1 | 10/2020 | Liu et al. |
| 2021/0407761 A1* | 12/2021 | Maeda ................ H01J 37/22 |
| 2022/0042933 A1 | 2/2022 | Dikolotsev et al. |

FOREIGN PATENT DOCUMENTS

| | | |
|---|---|---|
| CN | 106605140 A | 4/2017 |
| GB | 974393 A | 11/1964 |
| JP | H3223656 A | 10/1991 |
| JP | 9054050 A | 2/1997 |
| JP | H0949811 A | 2/1997 |
| JP | H0954050 A | 2/1997 |
| JP | 2006250938 A | 9/2006 |
| JP | 2008258606 A | 10/2008 |
| JP | 2014109579 A | 6/2014 |
| TW | 201546444 A | 12/2015 |
| TW | 201704728 A | 2/2017 |
| TW | 201802245 A | 1/2018 |
| WO | 9624863 A | 8/1996 |
| WO | 2013052318 A1 | 4/2013 |
| WO | 2014184179 A1 | 11/2014 |
| WO | 2017167294 A1 | 10/2017 |

OTHER PUBLICATIONS

U.S. Appl. No. 17/505,696 Office Action dated Sep. 27, 2022.
TW Application # 108113313 Office Action dated Nov. 16, 2022.
Jones et al., "Small angle x-ray scattering for sub-100 nm pattern characterization", Applied Physics Letters, vol. 83, No. 19, pp. 4059-4061, Nov. 10, 2003.
Jones et al., "3-Dimensional Lineshape Metrology Using Small Angle X-ray Scattering", AIP Conference Proceedings, vol. 683, Issue 1, pp. 1-4, Sep. 2003.
Wormington et al., "Characterization of structures from X-ray scattering data using genetic algorithms", The Royal Society, Philosophical Transactions: Mathematical, Physical and Engineering Sciences, vol. 357, No. 1761, X-Ray Topography and Crystal Characterization, pp. 2827-2848, Oct. 15, 1999.
AXO Dresden GmbH, "Applied X-ray Optics and High Precision Deposition", Technical Data Sheet, pp. 1-23, May 22, 2013.
Dectris Ltd.,—detecting the future, Eiger X, Detector Series, "The Summit of Hybrid Photon Counting", pp. 1-4, Sep. 9, 2015.
Oxford Instruments., "50kV Microfocus X-ray source", Technical Data Sheet, pp. 1-2, May 19, 2015.
Xenocs., "X-ray eam delivery system", Technical Data Sheet, pp. 1-4, Sep. 15, 2009.
XOS., "Polycapillary Optics for Micro X-Ray Fluorescence and X-Ray Diffraction", pp. 1-4, Jul. 23, 2015.
Jones et al., "Subnanometer wavelength metrology of lithographically prepraed structures: a comparison of neutron and X-ray scattering", Proceedings of the SPIE, vol. 5038, pp. 191-199, year 2003.

(56) References Cited

OTHER PUBLICATIONS

Wiener et al., "Characterization of Titanium Nitride Layers by Grazing-Emission X-Ray Fluorescence Spectrometry", Applied Surface Science, vol. 125, pp. 129-136, Elsevier Science B.V., year 1999.
Oxford Instruments Inc., X-ray Tube Information, Series 5000, Model XTF5011, "Packaged X-Ray tubes", Technical Data Sheet, pp. 1-3, Jun. 1998.
Hayashi et al., "Refracted X-Rays Propagating Near the Surface Under Grazing Incidence Condition", Spectrochimica Acta, Part B 54, pp. 227-230, year 1999.
X-Ray Optical Systems, Inc., "Monolithic Polycapillary Lens Information", Albany, USA, 1 page, Dec. 29, 1998.
Di-Fonzo et al., "Non-Destructive Determination of Local Strain with 100-Nanometre Spatial Resolution", Letters to Nature, vol. 403, pp. 638-640, Feb. 10, 2000.
Guerault, "Specular Reflectivity and Off-Specular Scattering: Tools for Roughness Investigation", Institute Voor Kern—en Stralingsfysica, pp. 1-15, Dec. 15, 2000.
Hiu et al., "Small Angle X-Ray Scattering Metrology for Sidewall Angle and Cross Section of Nanometer Scale Line Gratings", Journal of Applied Physics, vol. 96, No. 4, pp. 1983-1987, Aug. 15, 2004.
Wu et al., "Small Angle Neutron Scattering Measurements of Nanoscale Lithographic Features", Polymer Preprints, vol. 42, No. 1, pp. 265-266, year 2001.
Kojima et al., "Structural Characterization of Thin Films by X-Ray Reflectivity", Rigaku Journal, vol. 16, No. 2, pp. 31-41, year 1999.
KR Application # 1020190044142 Office Action dated Mar. 6, 2023.
JP Application # 2020573226 Office Action dated Jan. 18, 2023.
TW Application # 112120075 Office Action dated Dec. 28, 2023.
U.S. Appl. No. 18/307,823 Office Action dated Jan. 30, 2024.
TW Application # 108113315 Office Action dated Jul. 25, 2022.
TW Applicaton # 108113314 Office Action dated Aug. 5, 2022.
Krokhmal, U.S. Appl. No. 17/830,389, filed Jun. 2, 2022.
"Fast SDD Ultra High Performance Silicon Drift Detector," Product Information, Amptek, Inc., pp. 1-4, year 2019, as downloaded from https://www.amptek.com/products/x-ray-detectors/fastsdd-x-ray-detectors-for-xrf-eds/fastsdd-silicon-drift-detector.
"Fast, Accurate and Precise Quantification Results Using an Annular Silicon Drift Detector: Bruker's XFlash FlatQuad," Product Information, Bruker, pp. 1-6, year 2022, as downloaded from https://www.bruker.com/en/news-and-events/webinars/2020/fast-accurate-and-precise-quantification-results-using-an-annular-silicon-drift-detector%e2%80%a6.html.
"Silicon Drift Detectors," Product Information, Ketek GmbH, pp. 1-4, year 2021, as downloaded from https://www.ketek.net/sdd/?gclid=EAlalQobChMlkNbPqKSJ-AIVjeJ3Ch0M_gFwEAAYASAAEgliJfD_BwE.
Jordan Valley Semiconductors Ltd., "D1 Evolution System", pp. 1-2, Israel, year 2013.
Crystal Scientific, "Channel Cut Crystals", UK, p. 1-1, year 2011.
AXO Dresden GMBH, "Multilayer mirrors—potentials for imaging, monochromating, collimating or focusing optics", ACTOP 11, Oxford, UK, Apr. 4-5, pp. 1-30, year 2011.
Bartels., "Characterization of thin layers on perfect crystals with a multipurpose high resolution x-ray diffractometer", Journal of Vacuum Science and Technology B1, vol. 1, issue 2, pp. 338-345, Apr. 1983.
Loxley et al., "The Performance of Channel Cut Collimators for Precision X-Ray Diffraction Studies of Epitaxial Layers", MRS Proceedings, vol. 208, pp. 107-112, year 1990.
Schuster et al., "Parallel-beam coupling into channel-cut monochromators using curved graded multilayers," Journal of Physics D: Applied Physics 28, A270-A275, pp. 1-7, year 1995.
Incoatec GmbH., "Montel Optics—'2D Multilayer Mirrors for X-ray Diffractometry", pp. 1-2, year 2015.
Incoatec, "The IµS-Story—10 Years Incoatec Microfocus Source", pp. 1-4, year 2016.
Excillum., MetalJet X-Ray Sources, pp. 1-2, year 2018.
Bruker AXS GmbH, "X-Ray source—MicroStar", pp. 1-2, Mar. 2018.
PiezoMotor., "Linear Motors", pp. 1-5, year 2017.
Lyncean Technologies, Inc, "The Compact X-Ray Station (CXS)", pp. 1-5, year 2017.
Bowen et al., "High resolution x-ray diffractometry and topography", pp. 1-278, Taylor & Francis Publication, year 1998.
Chadwick et al., "Radiolucent Structural Materials for Medical Applications", MDDI online, pp. 1-14, Jun. 1, 2001 downloaded from https://www.mddionline.com/news/radiolucent-structural-materials-medical-applications.
Paris et al., "A new experimental station for simultaneous X-ray microbeam scanning for small- and wide-angle scattering and fluorescence at Bessy II", Journal of Applied Crystallography, vol. 40, pp. s466-s470, year 2007.
KR Application # 1020240021620 Office Action dated Mar. 27, 2024.
JP Application # 2023108960 Office Action dated May 14, 2024.

\* cited by examiner

NAVIGATION ACCURACY USING CAMERA COUPLED WITH DETECTOR ASSEMBLY

FIELD OF THE INVENTION

The present invention relates generally to X-ray analysis, and particularly to methods and systems for improving navigation accuracy in X-ray measurements.

BACKGROUND OF THE INVENTION

Various techniques for improving navigation accuracy in semiconductor manufacturing processes have been published.

For example, U.S. Patent Application Publication 2007/0290703 describes a method and system for probing with electrical test signals on an integrated circuit specimen using a high-resolution microscope positioned for observing a surface of the specimen exposing electrically conductive terminals thereon. A housing is provided with a carrier therein for supporting the specimen in relation to the microscope and a probe assembly is positionable on the surface of the specimen for conveying and acquiring electrical test signals to and from the specimen. A drive system is provided for shifting at least one of the probes and the carrier to a predetermined test position. In one form the system has a heat shield for protecting one of the probe assemblies and the carrier from heat energy generated upon operation of the drive system, and in another form, the system has an environmental control for maintaining a desired temperature within the housing so that accurate measurements may be taken from the specimen.

U.S. Patent Application Publication 2020/0319443 describes an auto-focusing system is disclosed. The system includes an illumination source. The system includes an aperture. The system includes a projection mask. The system includes a detector assembly. The system includes a relay system, the relay system being configured to optically couple illumination transmitted through the projection mask to an imaging system. The relay system also being configured to project one or more patterns from the projection mask onto a specimen and transmit an image of the projection mask from the specimen to the detector assembly. The system includes a controller including one or more processors configured to execute a set of program instructions. The program instructions being configured to cause the one or more processors to: receive one or more images of the projection mask from the detector assembly and determine quality of the one or more images of the projection mask.

U.S. Patent Application Publication 2019/0310080 describes an overlay metrology tool providing site-by-site alignment includes a controller coupled to a telecentric imaging system. The controller may receive two or more alignment images of an overlay target on a sample captured at two or more focal positions by the imaging system, generate alignment data indicative of an alignment of the overlay target within the imaging system based on the alignment images, set the alignment images as measurement images when the alignment of the overlay target is within selected alignment tolerances, direct the imaging system to adjust the alignment of the overlay target in the imaging system and further receive one or more measurement images from the imaging system when the alignment of the overlay target is outside the selected alignment tolerances, and determine overlay between two or more layers of the sample based on at least one of the measurement images.

U.S. Patent Application Publication 2015/0241469 describes a scanning probe microscope (SPM) system and associated method. The SPM system having a probe adapted to interact with nanoscale features of a sample and scan within a target region to produce a three-dimensional image of that target region, the system maintaining location information for a plurality of features of interest of the sample according to a sample-specific coordinate system, wherein the SPM system is configured to adjust positioning of the probe relative to the sample according to a SPM coordinate system, the SPM system further configured to manage a dynamic relationship between the sample-specific coordinate system and the SPM coordinate system by determining a set of alignment errors between the sample-specific coordinate system and the SPM coordinate system and apply corrections to the SPM coordinate system to offset the determined alignment errors.

SUMMARY OF THE INVENTION

An embodiment of the present invention that is described herein provides a system including first and second imaging assemblies, and a processor.

The first imaging assembly is configured to produce a first image of a measurement site in a sample. The second imaging assembly is coupled with a measurement assembly and is configured to produce a second image of the measurement site. The processor is configured to: (i) perform, based on the first image, a first movement of the sample relative to the measurement assembly, (ii) perform, based on the second image, a second movement of the sample for aligning the sample with the measurement assembly, and (iii) control the measurement assembly to perform a measurement in the measurement site.

In some embodiments, the sample includes a semiconductor substrate, the measurement site includes a structure produced in the semiconductor substrate, the first imaging assembly includes an optical microscope, and the second imaging assembly includes an optical camera.

In other embodiments, the optical microscope is configured to produce the first image in one or more magnifications, the optical camera is configured to produce the second image, and the processor is configured to identify the measurement site in the first and second images. In yet other embodiments, the measurement assembly includes one or more X-ray detector assemblies (XDAs), each XDA includes multiple energy dispersive X-ray detectors surrounding a measurement position, and (i) a first distance between the optical microscope and the measurement position is larger than 50 mm, and (ii) a second distance between the optical camera and the measurement position is smaller than 25 mm.

In some embodiments, based on at least the second image, the processor is configured to align the measurement position with the measurement site. In other embodiments, the optical camera is positioned from at least one of the SDDs, at a third distance smaller than 20 mm. In yet other embodiments, the optical camera is configured to produce the second image in a single magnification.

In some embodiments, at least one of the energy dispersive X-ray detectors includes a silicon-drift detector (SDD). In other embodiments, the system includes an X-ray source, which is configured to direct an X-ray beam to the measurement position, and in response to directing the X-ray beam, at least one of the energy dispersive X-ray detectors is configured to detect X-ray fluorescence (XRF) emitted from the sample. In yet other embodiments, when the measurement position is aligned with the measurement site, the processor is configured to perform an XRF measurement in the structure produced in the semiconductor substrate.

In some embodiments, (i) based on the first image, the processor is configured to obtain in the first movement, a first positioning error between the measurement site and the measurement position, and (ii) based on the second image, the processor is configured to obtain in the second movement, a second positioning error between the measurement site and the measurement position, the second positioning error is smaller than the first positioning error. In other embodiments, the optical camera and the SDDs are coupled to a common support structure of the measurement assembly.

In an embodiment, at least one of the first movement and the second movement includes multiple movements. In another embodiment, the second movement is smaller than the first movement.

There is additionally provided, in accordance with an embodiment of the present invention, a system including: (a) an interface, which is configured to receive: (i) a first signal from a first imaging assembly, and (ii) a second signal from a second imaging assembly, which is coupled with a measurement assembly, and (b) a processor, which is configured to: (i) identify, based on the first signal, a measurement site in a sample, (ii) perform a first movement of the sample relative to the measurement assembly, (iii) identify the measurement site based on the second signal, and (iv) perform a second movement of the sample relative to the measurement assembly for performing a measurement in the measurement site.

There is additionally provided, in accordance with an embodiment of the present invention, a method including receiving a first signal from a first imaging assembly, and a second signal from a second imaging assembly, which is coupled with a measurement assembly. The measurement site is identified based on the second signal, and a second movement of the sample relative to the measurement assembly, is performed for aligning the sample with the measurement assembly. A measurement is performed in the measurement site.

The present invention will be more fully understood from the following detailed description of the embodiments thereof, taken together with the drawings in which:

DETAILED DESCRIPTION OF EMBODIMENTS

Overview

Figure 1:
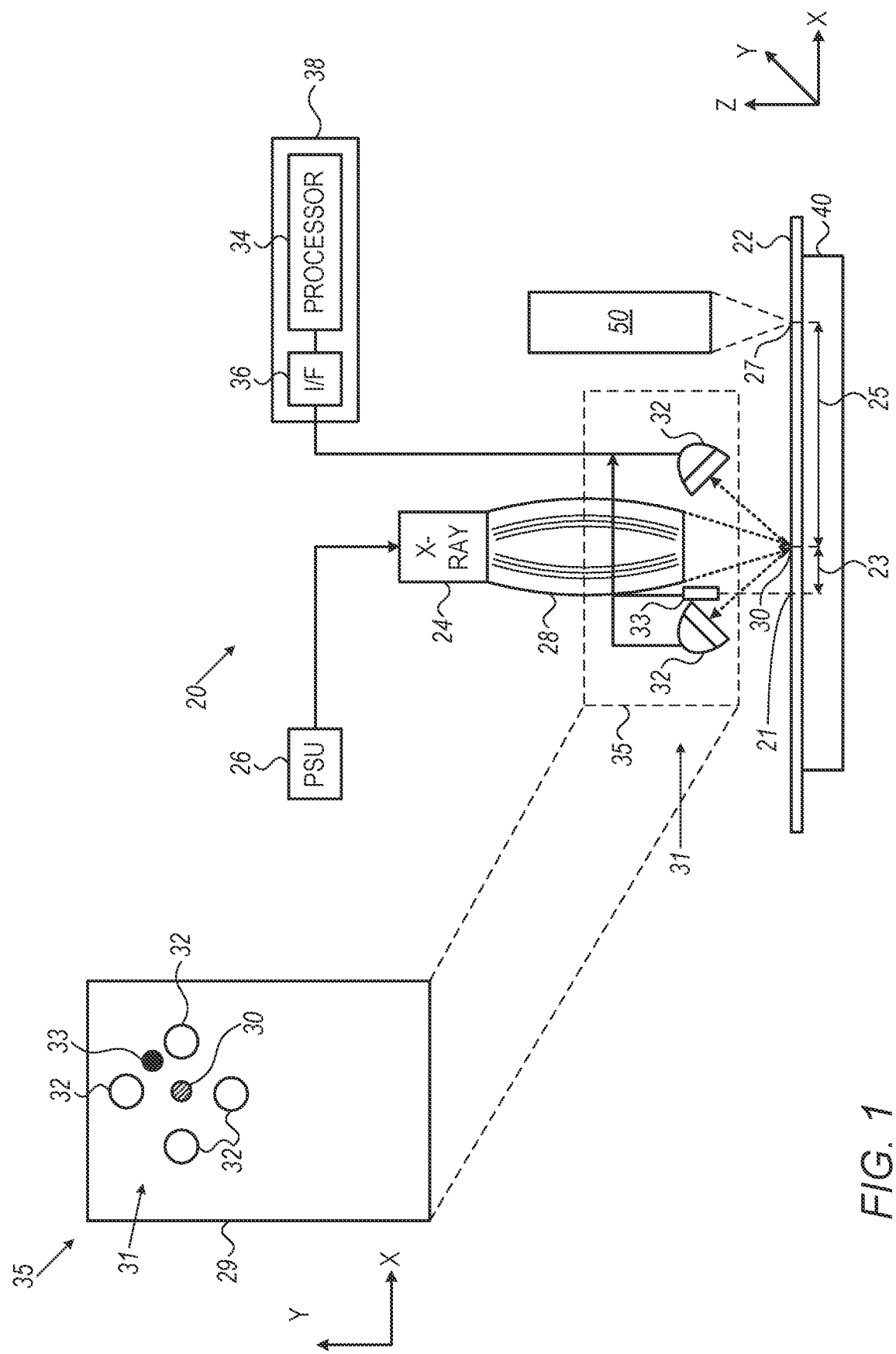
FIGS. 1 and 2 are schematic, pictorial illustrations of systems for X-ray fluorescence (XRF) measurement, in accordance with embodiments of the present invention.

Very large-scale integration (VLSI) fabrication processes of integrated circuits (IC) typically comprise measurements, such as X-ray measurements, at predefined measurement sites within the IC devices to ensure the fabricated structures meet the design requirements. The reduced dimensions of structures in the IC devices reduces the size of the measurement sites, and therefore, increases the requirements of navigation accuracy to enable suitable measurements at each measurement site.

Embodiments of the present invention that are described hereinafter provide techniques for improving the navigation accuracy of a system configured to perform a process and/or inspection or measurement at a specific site within an IC, during and after the production of the IC. In the present example, the system comprises an X-ray system, which is configured to carry out X-ray measurements at one or more measurement sites defined on a sample, such as but not limited to a semiconductor substrate (e.g., wafer) comprising multiple ICs being produced.

In some embodiments, the X-ray system comprises an X-ray source, which is configured to direct an X-ray beam to a measurement site, and a measurement assembly, such as an X-ray detector assembly (XDA), which may comprise multiple silicon-drift detectors (SDDs), or other solid-state energy dispersive detectors, surrounding a measurement position. In response to directing the X-ray beam, at least one of, and typically all the SDDs, are configured to detect X-rays, such as but not limited to fluorescence (XRF), emitted from the semiconductor wafer.

In some embodiments, the X-ray system comprises a first imaging assembly, in the present example an optical microscope (OM), which is configured to produce a first image of the measurement site in the wafer. The OM may have at least two magnifications, referred to herein as low and high magnifications. The low magnification (e.g., having a magnification objective lens of about 1×) may be used to identify the measurement site within a field-of-view (FOV) of the OM. The high magnification may be used to produce the first image (e.g., using a magnification objective lens between about 5× and 20×). Additionally, or alternatively, the low magnification objective lens may be used for acquiring the first image of the measurement site.

In some embodiments, the X-ray system comprises a second imaging assembly, in the present example a camera having a single magnification, which is coupled with the measurement assembly and is configured to produce a second image of the measurement site. In the context of the present disclosure and in the claims, the terms "coupled with" and "coupled to" also refer to the camera being integrated with or integrated to the respective measurement assembly.

In some embodiments, the X-ray system comprises a movable stage, which is controlled by a processor, and is configured to move the wafer relative to the X-ray source, XDA and imaging assemblies. Based on the first and second images, the processor is configured to control the stage to align the measurement site (defined on the wafer) with the measurement position defined by the configuration of the XDA, so as to perform the X-ray measurement at the measurement site. Note that any misalignment (e.g., lateral offset) between the measurement position and the measurement site, may result in measuring a structure other than that at the measurement site, and therefore, in reducing the quality of the process control.

In some embodiments, the FOV of OM is disposed in the X-ray system, at a distance larger than about 50 mm, and typically at about 100 mm, from the measurement position defined by the configuration of the X-ray source and XDA. Moreover, when the X-ray system comprises two or more X-ray sources and XDAs, the distance between the OM and a given measurement position, may be at least 100 mm.

Typically, the positioning accuracy of the stage is determined, inter alia, by the movement distance of the measurement site relative to the measurement position. Therefore, a shorter travel of the stage results in improved positioning accuracy, and therefore, improved alignment between the measurement position and the measurement site, which is essential for the quality of the X-ray measurements. In the context of the present disclosure and in the claims, the term "quality" of the X-ray measurements, refers to precision (e.g., repeatability) and accuracy of the measurement results. For example, the repeatability is reduced when measuring different sites (due to positioning accuracy errors) instead of the same site disposed on the wafer.

In some embodiments, in the configuration described above, the FOV of the camera has a size of about 3 mm by 3 mm and the center of the FOV is located at a distance smaller than about 25 mm from the measurement position. In the present example at a distance of about 10 mm or 20 mm.

In some embodiments, in a calibration step of the system that is carried out before performing measurements, the processor is configured to perform a mapping of the movable stage, so as to improve the inherent positioning accuracy of the stage. For example, after the stage mapping, the positioning error of the stage is: (i) between about 3 μm and 6 μm in a travel of about 100 mm, and (ii) between about 0.3 μm and 0.6 μm in a travel of about 10 mm. In the context of the present disclosure and in the claims, the term "positioning error" refers to an offset (measured in distance) between the intended position and the actual position of a given position on the wafer, e.g., the measurement site.

In some embodiments, after the stage mapping and during the processing of the wafer, the processor is configured to receive coordinates of multiple measurement sites. For each measurement site, the processor is configured to move the wafer for positioning the measurement site within the low magnification FOV of the OM. The processor is configured to identify the measurement site using any suitable technique, such as applying pattern recognition algorithm(s) to the first image, and to control the OM to use the high magnification for acquiring and producing the first image of the measurement site.

In some embodiments, based on the first image, the processor is configured to control the stage to perform a first movement of the wafer, so as to position the measurement site within the FOV of the camera. Note that the first movement of the stage has a travelling range of about 100 mm (or any other suitable travel), so that the measurement site is typically located within the FOV of the camera.

In some embodiments, the processor is configured to control the camera to produce the second image of the measurement site. In such embodiments, the processor may apply pattern recognition algorithms for identifying the measurement site in both the first and second images. Subsequently, the processor is configured to control the stage to perform a second movement, e.g., of about 10 mm or 20 mm, so as to align the measurement site with the measurement position. Note that as written above, reducing the distance of the stage travel, e.g., to about 10 mm, significantly improves the alignment between the measurement site and the measurement position compared to the alignment obtained when in a stage travel of about 100 mm.

In some embodiments, at least one of the first movement and the second movement comprise multiple movements. In other words, one or both of the movements may be carried out in one or more position adjustments after making the first movement. Moreover, the second movement is typically smaller than the first movement.

In some embodiments, after aligning the measurement site and measurement position, the processor is configured to control the measurement assembly to perform the X-ray measurement(s) at the measurement site. More specifically, the processor controls the X-ray source to apply the X-ray beam to the measurement site, and performs the X-ray measurement based on signals received from the SDDs in response to applying the X-ray beam.

The disclosed techniques improve the navigation accuracy and the quality of measurements of X-ray systems and other systems performing measurements at predefined measurement site(s) in production processes of integrated circuits.

System Description

FIG. 1 is a schematic, pictorial illustration of an X-ray system 20, in accordance with an embodiment of the present invention.

In some embodiments, system 20 is configured to perform X-ray measurements at measurement sites of a sample. In the present example, the sample comprises a semiconductor substrate, referred to herein as a wafer 22, having structures, such as transistors, diodes and memory cells of an integrated circuit (IC) device. In the present example, system 20 comprises an X-ray Fluorescence (XRF) system, embodiments related to XRF systems of the Applicant are described in detail, for example, in U.S. Pat. Nos. 6,108,398 and 9,632,043.

In some embodiments, system 20 comprises an X-ray source 24, in the present example, an X-ray tube, driven by a high-voltage power supply unit (PSU) 26. The X-ray tube is configured to emit X-rays having a suitable energy range and flux into X-ray optics 28, which is aligned with X-ray source 24 in the XYZ coordinate system of system 20. X-ray optics 28 are configured to focus the X-ray beam onto a small region, referred to herein as a measurement position (MP) 30, e.g., a spot having a diameter typically between about 10 μm and 20 μm, but for some applications can be as large as about 100 μm, on the surface of wafer 22.

In the context of the present disclosure and in the claims, the terms "about" or "approximately" for any numerical values or ranges indicate a suitable dimensional tolerance that allows the part or collection of components to function for its intended purpose as described herein.

In some embodiments, system 20 comprises an integrated optical inspection system, also referred to herein as a first imaging assembly or an optical microscope (OM) 50, which is configured to produce an image of the surface of wafer 22 at a position 27. In the present example, OM 50 has at least two objective lenses configured to produce a high magnification (e.g., between about 5× and 20×) image and a low magnification (e.g., about 1×) image of the surface of wafer 22 at position 27. In the present example, the position of OM 50 determines a distance 25 between position 27 and MP 30, e.g., distance 25 is larger than about 50 mm, typically about 100 mm.

In some embodiments, system 20 comprises a measurement assembly 35, which is configured to perform one or more X-ray measurements in a site of wafer 22 that is aligned with MP 30. In other words, the X-ray measurements are carried out where MP 30 falls on the surface of wafer 22.

In some embodiments, measurement assembly 35 comprises one or more sets of suitable detectors, such as but not limited to solid-state energy dispersive X-ray detectors, and in the present example, the solid-state energy dispersive X-ray detectors comprise silicon-drift detectors (SDDs) 32, such as SDDs supplied by Bruker Corporation (Massachusetts 01821, United States), or by any other suitable SDD supplier, such as but not limited to, Amptek Inc. (Massachusetts 01730, United States), and KETEK GmbH (Munich, 81737, Germany). Each set of SDDs 32 is arranged in a respective X-ray detector assembly (XDA) 31.

Reference is now made to an inset 29 showing a bottom view of measurement assembly 35. In the present example, measurement assembly 35 comprises a single XDA 31 comprising four SDDs 32 arranged in a predefined geometry surrounding a projection of the position of MP 30 on an XY plane (defined by the XYZ coordinate system) of measurement assembly 35.

Reference is now made back to the general view of system 20. In some embodiments, system 20 comprises a second imaging assembly, in the present example a camera 33, which is coupled with measurement assembly 35. For example, camera 33 is integrated with measurement assembly 35, e.g., when producing measurement assembly 35 of system 20. Note that camera 33 is typically not directly coupled with any of SDDs 32, however, both camera 33 and SDDs 32 are coupled to a common support structure (e.g., a plate) of measurement assembly 35, and are electrically connected to an external entity (such as a processor described below) via electrical leads or traces for exchanging signals therebetween.

In some embodiments, camera 33 is configured to produce an image of the surface of wafer 22 at a position 21 located at a distance 23 from MP 30. In the present example, distance 23 is smaller than about 25 mm, and is typically about 10 mm, and camera 33 has a single magnification and the image produced by camera 33 has a field of view (FOV) of about 3 mm by 3 mm of the surface of wafer 22.

In alternative embodiments, camera 33 may be disposed in system 20 at a suitable position (for producing the image at a site of wafer 22 located at distance 23 from MP 30) without being coupled with measurement assembly 35.

The configuration of measurement assembly 35, XDA 31 and camera 33 is provided by way of example. In other embodiments, measurement assembly 35 may comprise any suitable number of XDAs 31, each of which having any suitable number of SDDs 32 (and/or any other suitable type of detectors) arranged in any suitable configuration. Moreover, measurement assembly 35 may have any suitable number of imaging assemblies coupled therewith, which are arranged, in addition to or instead of camera 33, using any suitable configuration.

In some embodiments, system 20 comprises a signal processing unit 38 having a processor 34 and an interface 36, which is configured to exchange signals between processor 34 and other entities of system 20, as will be described herein. System 20 comprises a movable stage 40, which is controlled by processor 34 and is configured to move wafer 22 in XY directions, and optionally also in Z direction, of the XYZ coordinate system. Additionally, or alternatively, stage 40 is further configured to rotate the wafer about the Z axis of the XYZ coordinate system.

In some embodiments, in a calibration step of the system that is carried out before performing measurements, processor 34 is configured to perform a mapping of the movable stage 40, to improve the inherent positioning accuracy of the stage. For example, after the stage mapping, the positioning error of stage 40 is: (i) between about 3 µm and 6 µm when stage 40 travels about 100 mm, and (ii) between about 0.3 µm and 0.6 µm when stage 40 travels about 10 mm. In the context of the present disclosure and in the claims, the term "positioning error" refers to an offset, in the XY plane (measured in distance units, e.g., millimeters), between the intended position and the actual position of a selected site of wafer 22, relative to a reference position of system 20. In some cases, the positioning error is not constant and will vary across the XY plane of the stage 40.

In some embodiments, when getting started with performing X-ray measurements, processor 34 is configured to receive a list of one or more measurement sites intended to be measured by system 20. When selecting from the list a measurement site, wafer 22 is moved so that the selected measurement site is aligned with OM 50 along the Z-axis and processor 34 controls OM 50 to produce a first image of the measurement site. Note that processor 34 receives the first image from OM 50, and is configured to apply pattern recognition algorithms in order to identify the measurement site in the FOV of the first image. In some embodiments, processor 34 is configured to control a magnification of OM 50 for acquiring the first image.

Subsequently, processor 34 controls stage 40 to perform a movement (also referred to herein as a first movement) of wafer 22, to position the measurement site within the FOV of camera 33. Note that the first movement of stage 40 has a travelling range of distances 25 and 23, which is about 100 mm (e.g., between about 80 mm and 120 mm), so that the measurement site is typically located within the 3 mm by 3 mm of the FOV of camera 33.

In some embodiments, when the selected measurement site is aligned with camera 33, processor 34 is configured to control camera 33 to produce a second image of the measurement site. In such embodiments, processor 34 may also apply pattern recognition algorithms for identifying the measurement site in the second image. Subsequently, processor 34 is configured to control stage 40 to perform a movement (referred to herein as a second movement), e.g., of about 10 mm, from position 21 along distance 23, to align the measurement site with MP 30. Note that in the context of the present disclosure and in the claims, the term "align" and grammatical variations thereof refer to positioning accuracy having an offset smaller than about 0.5 um in the XY-plane of the XYZ coordinate system.

In some embodiments, reducing the distance travelled by stage 40, e.g., from about 100 mm to about 10 mm, significantly improves the positioning accuracy (i.e., reduces the positioning error) of stage 40, e.g., from about 5 µm to about 0.5 µm, respectively. The improved positioning accuracy improves the alignment between the selected measurement site on wafer 22 and MP 30.

In some embodiments, after aligning the measurement site and MP 30, processor 34 is configured to control X-ray source 24 and measurement assembly 35 to perform the X-ray measurement(s) at the measurement site.

More specifically, in some embodiments, processor 34 controls X-ray source 24 to apply the X-ray beam to MP30. In response to the X-ray beam directed to and impinging on the surface of wafer 22, at least one of and typically each SDD 32, is configured to detect XRF emitted from the measurement site on wafer 22 that is aligned with MP 30. Note that the position of MP 30 is determined by the configuration and arrangement of X-ray source 24, X-ray optics 28, and SDDs 32, and the site on wafer 22. In such embodiments, in response to applying the X-ray beam, processor 34 performs the X-ray measurement based on signals received from SDDs 32.

This particular configuration of FIG. 1 is provided by way of example, and is simplified for the sake of conceptual clarity. In other embodiments, wafer 22 is mounted on a suitable stationary fixture while X-ray source 24, X-ray optics 28 and measurement assembly 35 are being moved for performing the X-ray measurements described above.

In alternative embodiments, the disclosed techniques can be used, mutatis mutandis, in other types of suitable measurement and inspection systems, such as optical-based, X-ray based other than XRF, electron-beam based, and ion-beam based systems. Moreover, the disclosed techniques can be used, mutatis mutandis, in other types of systems configured to carry out local operations other than measurement. For example, systems designed for probing processes, local deposition processes, local etching and/or drilling processes, carried out on any suitable sample, not limited to a semiconductor substrate.

In some embodiments, processor 34 comprises a general-purpose computer, which is programmed in software to carry out the functions described herein. The software may be downloaded to the computer in electronic form, over a network, for example, or it may, alternatively or additionally, be provided and/or stored on non-transitory tangible media, such as magnetic, optical, or electronic memory.

Improving Navigation Accuracy in a System Having Multiple Channels

Figure 2:
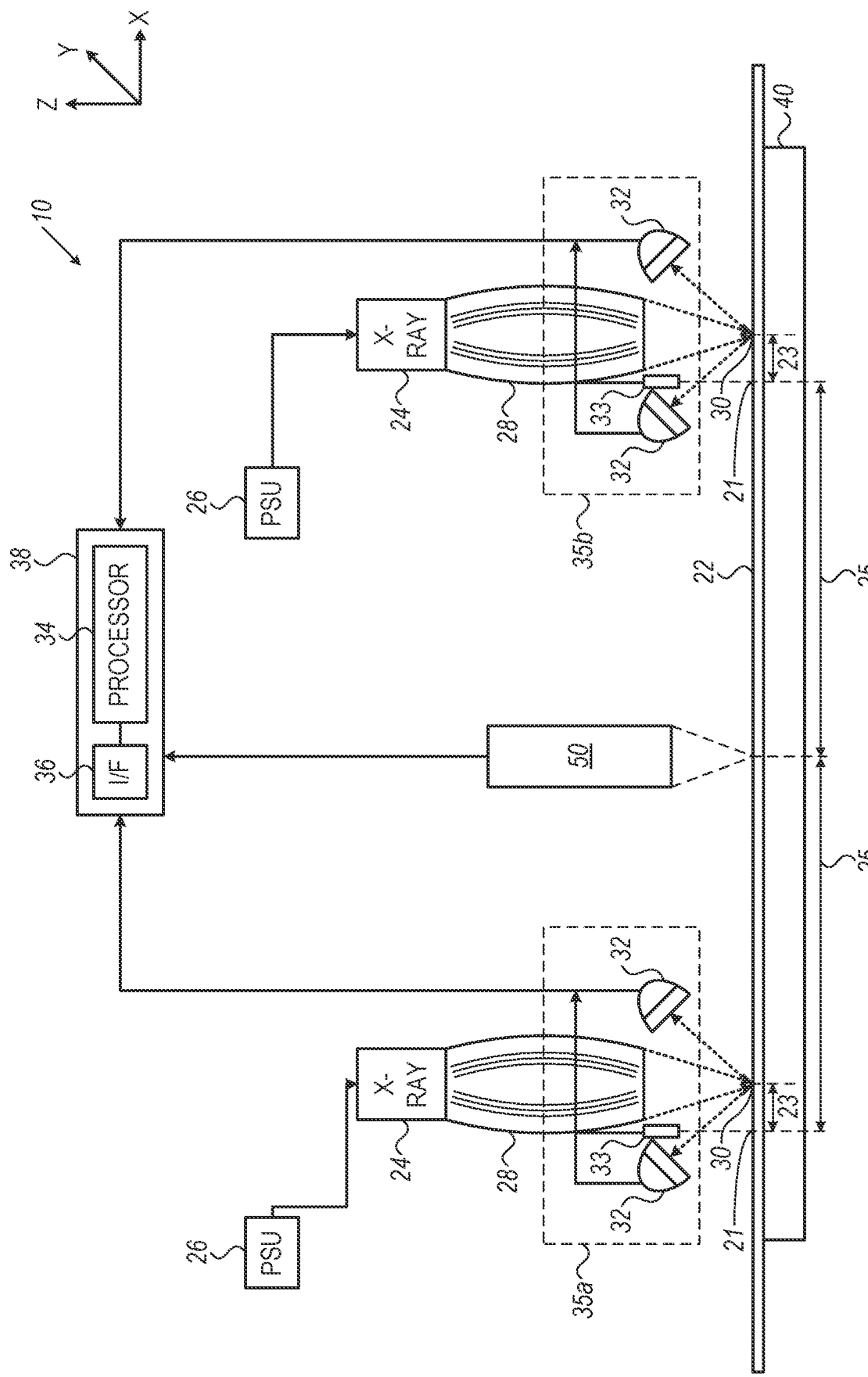

FIG. 2 is a schematic, pictorial illustration of an X-ray system 10, in accordance with an embodiment of the present invention. In some embodiments, system 20 of FIG. 1 above has a single channel for performing the X-ray measurements, whereas system 10 has multiple channels.

In some embodiments, system 10 has a single stage 40, a single OM 50, and a common processing unit 38 (having interface 36 and processor 34), which is similar to the configuration of system 20 described in FIG. 1 above. In the present example, however, system 10 comprises two sets of X-ray measurement channels. Each X-ray measurement channel of system 10 comprises: a PSU 26, an X-ray source 24 and a measurement assembly 35. More specifically, system comprises measurement assemblies 35a and 35b each of which has SDDs 32 and a respective camera 33, e.g., cameras 33a and 33b coupled to measurement assemblies 35a and 35b, respectively, as described in detail in FIG. 1 above. In such embodiments, system 10 is configured to carry out, at the same time, two navigation processes (having improved navigation accuracy as described in FIG. 1 above), and two X-ray measurements at two respective measurement sites of wafer 22.

In alternative embodiments, system 10 has two different stages 40, and therefore, based on the techniques described in FIG. 1 above, system 10 is configured to perform X-ray measurements on two wafers 22 at the same time. Additionally, or alternatively, system 10 may comprise two OMs 50 (i.e., a separate OM for each channel), so that the first step of the navigation process (i.e., producing the first image using OM 50) may be carried out in both wafers 22 at the same time.

These particular configurations of systems 10 and 20 are shown by way of example, in order to illustrate certain problems, such as positioning errors, which are addressed by embodiments of the present invention and to demonstrate the application of these embodiments in enhancing the performance of such systems. Embodiments of the present invention, however, are by no means limited to this specific sort of example XRF system, and the principles described herein may similarly be applied to other sorts of measurement systems that are known in the art.

Figure 3:
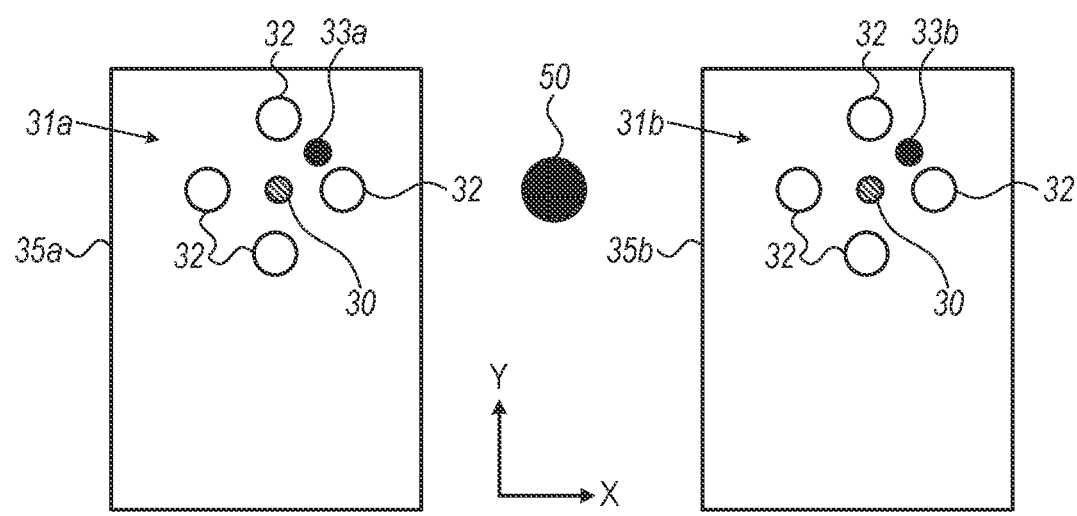
FIG. 3 is a schematic, pictorial illustration of X-ray detector assemblies (XDAs) and an optical microscope of the system of FIG. 2 above, in accordance with an embodiment of the present invention.

FIG. 3 is a schematic, pictorial illustration of measurement assemblies 35a and 35b of system 10 of FIG. 2 above, in accordance with an embodiment of the present invention.

In some embodiments, measurement assembly 35a comprises XDA 31a having four SDDs 32, and a camera 33a, which is like camera 33 of FIG. 1 above, and is coupled with measurement assembly 35a at a fixed position relative to the projection of MP 30.

In some embodiments, measurement assembly 35b, which has a similar structure compared to that of measurement assembly 35a, comprises XDA 31b having four SDDs 32, and a camera 33b, which is like camera 33a of measurement assembly 35a. Camera 33b and is coupled with measurement assembly 35b at a fixed position relative to the projection of MP 30.

In some embodiments, each of measurement assemblies 35a and 35b has a rectangular shape with a size of about 200 mm along the Y-axis, and about 80 mm along the X-axis. The center-of-gravities (COGs) of adjacent SDDs 32 are positioned at a distance smaller than about 15 mm from one another, and each SDD 32 has a diameter between about 10 mm and 13 mm, so that the camera (e.g., camera 33a) is disposed between adjacent SDDs 32 (as shown in FIGS. 1 and 3) or at any other suitable location positioned at a distance smaller than 30 mm or 20 mm or 10 mm from the projection of MP 30

In the example of FIG. 3, measurement assemblies 35a and 35b are positioned at a distance of about 120 mm from one another, so as to enable sufficient space for disposing OM 50 therebetween. In other embodiments, OM 50 may be mounted on system 10 at any other suitable location, and therefore, measurement assemblies 35a and 35b may be positioned at any other suitable distance from one another. Note that the distance between the X-ray channels may be configurable and determined based on the size of wafer 22 and the sampling strategy of the user of system 10, so as to enable two X-ray measurements on wafer 22 (or on different wafers 22 in embodiments described above) at the same time.

The configuration, shape, and dimensions of measurement assemblies 35a and 35b and of the components thereof, are provided by way of example. In other embodiments, measurement assemblies 35a and 35b may have any other suitable configurations, which may be similar to or different from one another, and may have the same components or any other suitable components, in addition to or instead of the components described in FIGS. 1 and 3.

Figure 4:
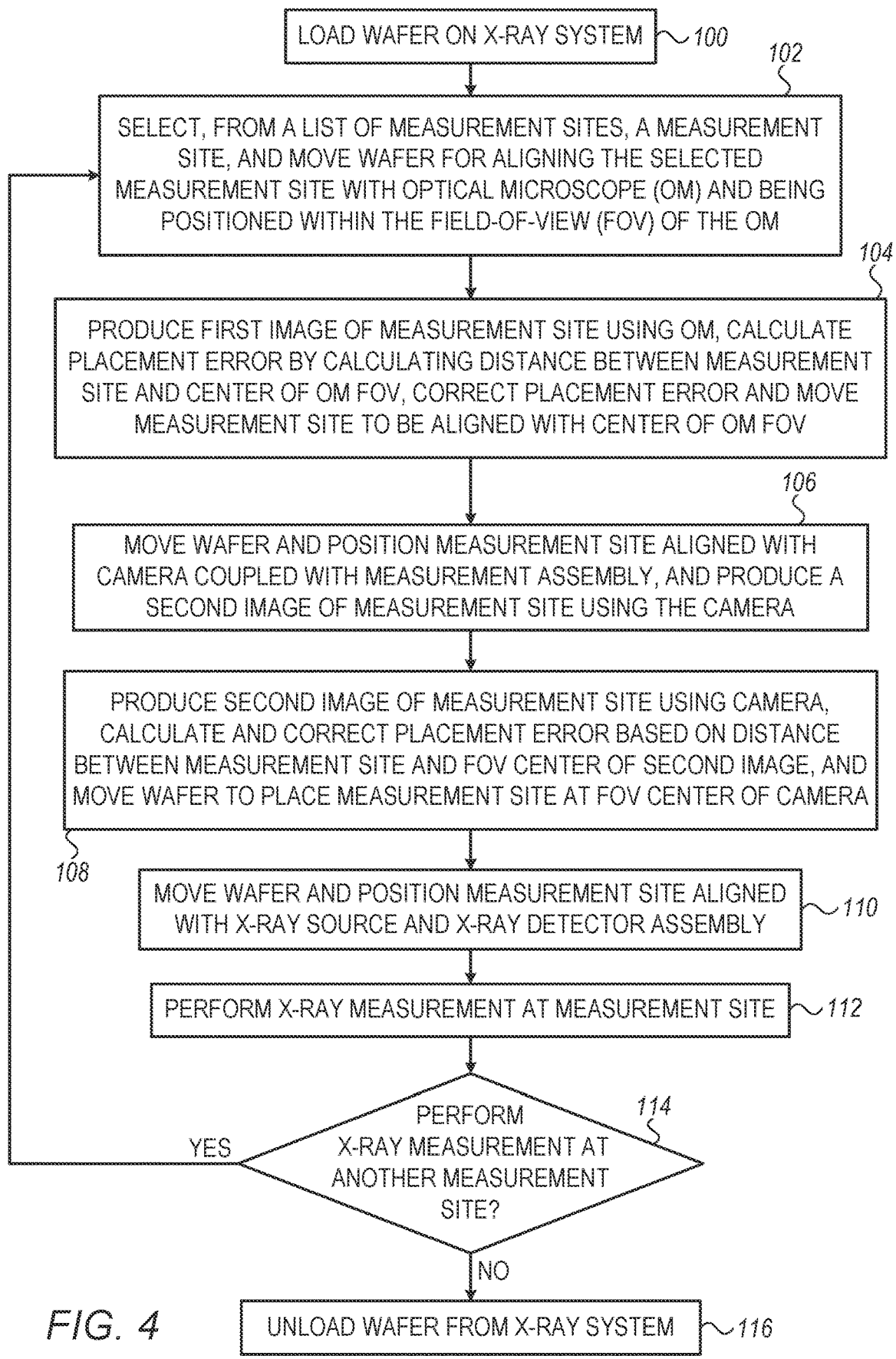
FIG. 4 is a flow chart that schematically illustrates a method for performing X-ray measurements and improving navigation accuracy in the systems of FIGS. 1 and 2 above, in accordance with an embodiment of the present invention.

FIG. 4 is a flow chart that schematically illustrates a method for performing X-ray measurements and improving navigation accuracy in X-ray system 20, in accordance with an embodiment of the present invention. The method is also applicable, mutatis mutandis, to performing X-ray measurements in system 10 of FIG. 2 above.

At a wafer loading step 100, processor 34 is configured to control the loading of wafer 22 on system 20 (using any suitable loading technique) and placement of wafer 22 on stage 40, and subsequently, to attach wafer 22 to stage 40.

At a measurement site selection step 102, processor 34 receives a list of measurement sites, selects from the list a measurement site, and move wafer 22 (using stage 40) to the coordinates of the selected site for aligning the selected measurement site with OM 50, so that the measurement site is positioned within the FOV of OM 50, as described in detail in FIG. 1 above.

At a first image production step 104, processor 34 produces a first image of the measurement site, based on image signals received from OM 50, and identifies the measurement site in the first image, as described in detail in FIG. 1 above. In some embodiments, processor 34 is configured to calculate a distance between the identified measurement site and the center of the field of view (FOV) of OM 50, which is indicative, inter-alia, of a placement error of stage 40.

In some embodiments, processor 34 controls stage 40 to move wafer 22 for correcting the calculated error and for placing measurement site aligned with the center of FOV of OM 50.

At a first movement step 106, processor 34 controls stage 40 to move wafer 22 about 100 mm, so as to position the measurement site aligned with camera 33 (e.g., in the XY plane of the XYZ coordinate system), which is coupled with measurement assembly 35.

In some embodiments, processor 34 may use the error calculated in step 104 to perform mapping of stage 40 (also referred to herein as, stage mapping) for improving the positioning accuracy of stage 40.

At a second image production step 108, processor 34 produces a second image of the measurement site, based on image signals received from camera 33, as described in detail in FIG. 1 above. Note that step 108 is concluded when the measurement site is positioned within the FOV of the second image produced by camera 33.

In some embodiments, processor 34 is configured to calculate the placement error of stage 40 based on a calculated distance between the measurement site and the FOV center of the second image produced based on the signals received from camera 33, and to adjust the stage mapping for correcting the placement error.

In some embodiments, processor 34 controls stage 40 to move wafer 22 to correct the calculated error and to place the measurement site at the center of the FOV of camera 33. Note that, in other embodiments, the movement of wafer 22 for positioning the measurement site at the center of the FOV of camera 33 may be considered a separate step of the method.

At a second movement step 110, processor 34 controls stage 40 to move wafer 22 about 10 mm or 15 mm, so as to position the measurement site aligned (in the XY-plane) with X-ray source 24 and XDA 31 of measurement assembly 35, as described in detail in FIG. 1 above.

At an X-ray measurement step 112, processor 34 controls X-ray source 24 and XDA 31 of measurement assembly to perform one or more X-ray measurement at the measurement site, as described in detail in FIG. 1 above.

At a decision step 114, processor 34 checks whether to perform X-ray measurement at another measurement site of wafer 22. In case another measurement is needed, the method loops back to step 102.

In case no additional measurements are required on wafer 22, the method proceeds to a wafer unloading step 116, in which processor 34 controls a robot of system 20 to unload wafer 22.

The method of FIG. 4 is provided by way of example, and may be used, mutatis mutandis, in other processes, such as measurements on semiconductor wafers or on any other suitable substrate having one or more measurement sites.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
   a first imaging assembly, which comprises an optical microscope, is configured to produce a first image of a measurement site, which comprises a structure produced in a sample comprising a semiconductor substrate;
   a second imaging assembly, which comprises an optical camera, is coupled with a measurement assembly and is configured to produce a second image of the measurement site; and
   a processor, which is configured to: (i) perform, based on the first image, a first movement of the sample relative to the measurement assembly, (ii) perform, based on the second image, a second movement of the sample for aligning the sample with the measurement assembly, and (iii) control the measurement assembly to perform a measurement in the measurement site.

2. The system according to claim 1, wherein the optical microscope is configured to produce the first image in one or more magnifications, and the optical camera is configured to produce the second image, and wherein the processor is configured to identify the measurement site in the first and second images.

3. The system according to claim 1, wherein the measurement assembly comprises one or more X-ray detector assemblies (XDAs), each XDA comprises multiple energy dispersive X-ray detectors surrounding a measurement position, and wherein: (i) a first distance between the optical microscope and the measurement position is larger than 50 mm, and (ii) a second distance between the optical camera and the measurement position is smaller than 25 mm.

4. The system according to claim 3, wherein, based on at least the second image, the processor is configured to align the measurement position with the measurement site.

5. The system according to claim 3, wherein the optical camera is positioned from at least one of the SDDs, at a third distance smaller than 20 mm.

6. The system according to claim 3, wherein the optical camera is configured to produce the second image in a single magnification.

7. The system according to claim 3, wherein at least one of the energy dispersive X-ray detectors comprises a silicon-drift detector (SDD).

8. The system according to claim 3, and comprising an X-ray source, which is configured to direct an X-ray beam to the measurement position, and wherein, in response to directing the X-ray beam, at least one of the energy dispersive X-ray detectors is configured to detect X-ray fluorescence (XRF) emitted from the sample.

9. The system according to claim 8, wherein, when the measurement position is aligned with the measurement site, the processor is configured to perform an XRF measurement in the structure produced in the semiconductor substrate.

10. The system according to claim 3, wherein, (i) based on the first image, the processor is configured to obtain in the first movement, a first positioning error between the measurement site and the measurement position, and (ii) based on the second image, the processor is configured to obtain in the second movement, a second positioning error between the measurement site and the measurement position, wherein the second positioning error is smaller than the first positioning error.

11. The system according to claim 3, wherein the optical camera and the SDDs are coupled to a common support structure of the measurement assembly.

12. The system according to claim 1, wherein at least one of the first movement and the second movement comprises multiple movements.

13. The system according to claim 1, wherein the second movement is smaller than the first movement.

14. A system, comprising:
an interface, which is configured to receive: (i) a first signal from a first imaging assembly, and (ii) a second signal from a second imaging assembly, which is coupled with a measurement assembly; and
a processor, which is configured to: (i) identify, based on the first signal, a measurement site in a sample, (ii) perform a first movement of the sample relative to the measurement assembly, (iii) identify the measurement site based on the second signal, and (iv) perform a second movement of the sample relative to the measurement assembly for performing a measurement in the measurement site, wherein the sample comprises a semiconductor substrate, and the measurement site comprises a structure produced in the semiconductor substrate, and wherein the first imaging assembly comprises an optical microscope, and the second imaging assembly comprises an optical camera.

15. The system according to claim 14, wherein the measurement assembly comprises one or more X-ray detector assemblies (XDAS), each XDA comprises multiple energy dispersive X-ray detectors surrounding a measurement position, and wherein: (i) a first distance between the optical microscope and the measurement position is larger than 50 mm, and (ii) a second distance between the optical camera and the measurement position is smaller than 25 mm.

16. The system according to claim 15, wherein, (i) based on the first image, the processor is configured to obtain in the first movement, a first positioning error between the measurement site and the measurement position, and (ii) based on the second image, the processor is configured to obtain in the second movement, between the measurement site and the measurement position, a second positioning error, smaller than the first positioning error.

17. The system according to claim 15, wherein at least one of the energy dispersive X-ray detectors comprises a silicon-drift detector (SDD).

18. The system according to claim 15, wherein the optical camera and the X-ray detectors are coupled to a common support structure of the measurement assembly.

19. A method, comprising:
receiving a first signal from a first imaging assembly, and a second signal from a second imaging assembly, which is coupled with a measurement assembly;
identifying, based on the first signal, a measurement site in a sample, and performing a first movement of the sample relative to the measurement assembly;
identifying the measurement site based on the second signal, and performing a second movement of the sample relative to the measurement assembly for aligning the sample with the measurement assembly; and
performing a measurement in the measurement site, wherein the sample comprises a semiconductor substrate and the measurement site comprises a structure produced in the semiconductor substrate, and wherein the first imaging assembly comprises an optical microscope, and the second imaging assembly comprises an optical camera.

20. The method according to claim 19, wherein the measurement assembly comprises one or more X-ray detector assemblies (XDAS), each XDA comprises multiple energy dispersive X-ray detectors surrounding a measurement position, and wherein: (i) a first distance between the optical microscope and the measurement position is larger than 50 mm, and (ii) a second distance between the optical camera and the measurement position is smaller than 25 mm.

21. The method according to claim 20, wherein, (i) based on the first image, the processor is configured to obtain in the first movement, a first positioning error between the measurement site and the measurement position, and (ii) based on the second image, the processor is configured to obtain in the second movement, between the measurement site and the measurement position, a second positioning error, smaller than the first positioning error.

22. The method according to claim 20, wherein the camera and the energy dispersive X-ray detectors are coupled to a common support structure of the measurement assembly.

23. The method according to claim 19, wherein performing the second movement comprises performing a smaller movement compared to the first movement.

* * * * *